United States Patent
Huang et al.

(10) Patent No.: US 10,267,977 B2
(45) Date of Patent: Apr. 23, 2019

(54) DEVICE FOR TRANSPORTING LIGHT

(71) Applicant: INTERDIGITAL CE PATENT HOLDINGS, Paris (FR)

(72) Inventors: Wenxin Huang, Beijing (CN); Zuke Zhou, Beijing (CN); Juzhi Qin, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/533,030

(22) PCT Filed: Dec. 4, 2014

(86) PCT No.: PCT/CN2014/093058
§ 371 (c)(1),
(2) Date: Jun. 4, 2017

(87) PCT Pub. No.: WO2016/086394
PCT Pub. Date: Jun. 9, 2016

(65) Prior Publication Data
US 2017/0329074 A1    Nov. 16, 2017

(51) Int. Cl.
*F21V 8/00*    (2006.01)

(52) U.S. Cl.
CPC ......... *G02B 6/0075* (2013.01); *G02B 6/0008* (2013.01)

(58) Field of Classification Search
CPC .. G02B 6/0008; G02B 6/0075; G02B 6/0076; G02B 6/0078; G02B 6/4249
See application file for complete search history.

(56) References Cited

U.S. PATENT DOCUMENTS

| | | | | |
|---|---|---|---|---|
| 5,327,328 A | * | 7/1994 | Simms | G02B 6/0001 362/23.07 |
| 5,760,754 A | * | 6/1998 | Amero, Jr. | G09F 9/305 345/102 |
| 5,876,239 A | * | 3/1999 | Morin | H01R 13/717 439/490 |
| 5,883,994 A | * | 3/1999 | Snyder | G02B 6/26 385/147 |
| 5,915,060 A | | 6/1999 | Kerskey et al. | |
| 5,938,324 A | * | 8/1999 | Salmon | G01D 11/28 362/551 |

(Continued)

FOREIGN PATENT DOCUMENTS

| | | |
|---|---|---|
| CN | 101201426 | 6/2008 |
| CN | 101201427 | 6/2008 |

(Continued)

OTHER PUBLICATIONS

Wild et al., "From Development to Start of Production", International Light Simulation Symposium (ILISIS) 2012, Nuremberg, Germany, Mar. 7, 2012, pp. 1-13.

*Primary Examiner* — Alexander K Garlen
(74) *Attorney, Agent, or Firm* — Jeffrey M. Navon (57) ABSTRACT

It is provided a device for transporting light, comprising at least two light pipes and at least one connection part, the at least two light pipes and the at least one connection part are molded with same material as a single component, wherein each connection part includes a triangular prism having a connection surface for connecting the at least two light pipes and two other surfaces having acute angles with the connection surface.

14 Claims, 10 Drawing Sheets

(56) References Cited

U.S. PATENT DOCUMENTS

| | | | |
|---|---|---|---|
| 6,463,204 B1 | 10/2002 | Ati | |
| 7,083,315 B2 | 8/2006 | Hansler et al. | |
| 7,909,482 B2 | 3/2011 | Veenstra et al. | |
| 2007/0171678 A1* | 7/2007 | Shim | G02B 6/0016 362/616 |
| 2008/0137361 A1* | 6/2008 | Ho | G02B 6/0006 362/555 |
| 2008/0291668 A1 | 11/2008 | Aylward et al. | |
| 2010/0060476 A1 | 3/2010 | Yaji Ma et al. | |
| 2010/0061080 A1* | 3/2010 | Salters | G02B 6/0068 362/97.1 |
| 2015/0153019 A1* | 6/2015 | Yoshizumi | G02B 6/0096 362/555 |

FOREIGN PATENT DOCUMENTS

| | | |
|---|---|---|
| CN | 201269513 | 7/2009 |
| CN | 201297575 | 8/2009 |
| CN | 101737718 | 6/2010 |
| GB | 2462963 | 5/2010 |
| JP | S61151684 | 7/1986 |
| JP | 2001508583 | 6/2001 |
| JP | 2009180926 | 8/2009 |
| JP | 2015106068 | 6/2015 |
| KR | 20140091877 | 7/2014 |
| WO | WO9807168 | 2/1998 |

\* cited by examiner

DEVICE FOR TRANSPORTING LIGHT

This application claims the benefit, under 35 U.S.C. § 365 of International Application PCT/CN2014/093058, filed Dec. 4, 2014, which was published in accordance with PCT Article 21(2) on Jun. 9, 2016, in English.

TECHNICAL FIELD

The present disclosure relates to light transport, and more particularly relates to a device for transporting light.

BACKGROUND

A waveguide is a structure that guides waves, such as electromagnetic waves or sound waves. There are different types of waveguides for each type of wave.

For optical waves, the corresponding waveguide is an optical waveguide. It is a physical structure that guides electromagnetic waves in the optical spectrum. As examples of optical waveguides, light tubes or light pipes are physical structures used for transporting or distributing natural or artificial light for the purpose of illumination.

In electronic devices, molded plastic light tubes are commonly used in the electronics industry to direct illumination from LEDs (light emitting diode) on a circuit board to indicator symbols or buttons in the front panel. These light tubes typically take on a highly complex shape that either uses gentle curving bends as in an optic fiber or has sharp prismatic folds which reflect off the angled corners. Multiple light tubes are often molded from a single piece of plastic, permitting easy device assembly since the long thin light tubes are all parts of a single rigid component that snaps into place.

Light tube indicators make electronics cheaper to manufacture since the old way would be to mount or install a tiny lamp into a small socket directly behind the spot to be illuminated. This often requires extensive hand-labor for installation and wiring. Light tubes permit all lights to be mounted on a single flat circuit board, but the illumination can be directed up and away from the board by several inches, wherever it is required.

Some products require different color LEDs to be closely placed in certain pattern. Thus different light pipes are required for the light transfer. The ideal solution is that light pipe are isolated from each other and mounted separately to avoid light leakage and interference. But this will cause high product cost and complex production process. A common solution in the industry is to add some rectangle bars with the same material as the light pipe (or called rectangular parallelepiped) as bridge to connect all light pipes for low cost. For cost reason, the rectangular bars and the light pipes are molded together as a single component. However, the connection bridges may cause light leakage and interference between different light pipes to which they connect.

SUMMARY

According to an aspect of the present disclosure, it is provided a device for transporting light, comprising at least two light pipes and at least one connection part, the at least two light pipes and the at least one connection part are molded with same material as a single component, wherein each connection part includes a triangular prism having a connection surface for connecting the at least two light pipes and two other surfaces having acute angles with the connection surface.

It is to be understood that more aspects and advantages of the disclosure will be found in the following detailed description of the present disclosure.

BRIEF DESCRIPTION OF THE DRAWINGS

The accompanying drawings, which are included to provide a further understanding of the disclosure and are incorporated in and constitute a part of this application, will be used to illustrate an embodiment of the disclosure, as explained by the description. The disclosure is not limited to the embodiment.

In the drawings.

DETAILED DESCRIPTION

The embodiment of the present disclosure will now be described in detail in conjunction with the drawings. In the following description, some detailed descriptions of known functions and configurations may be omitted for clarity and conciseness.

Figure 1:
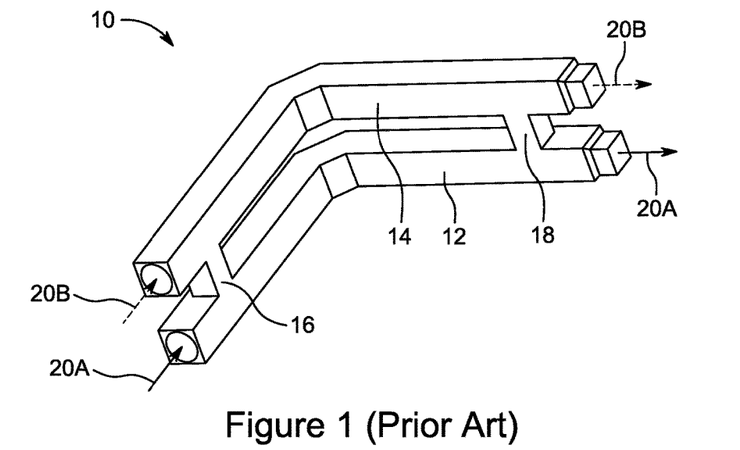
FIG. 1 is a diagram showing ideal light transfer path according to prior art.
Figure 2:
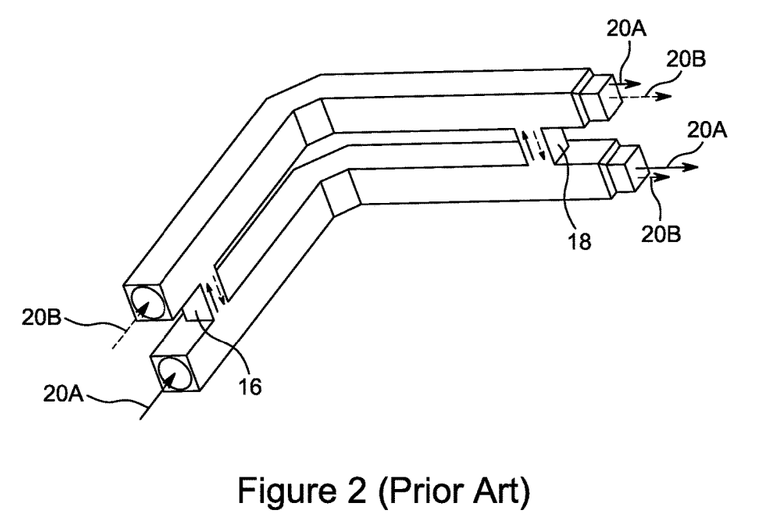
FIG. 2 is a diagram showing actual light transfer according to prior art.
Figure 3:
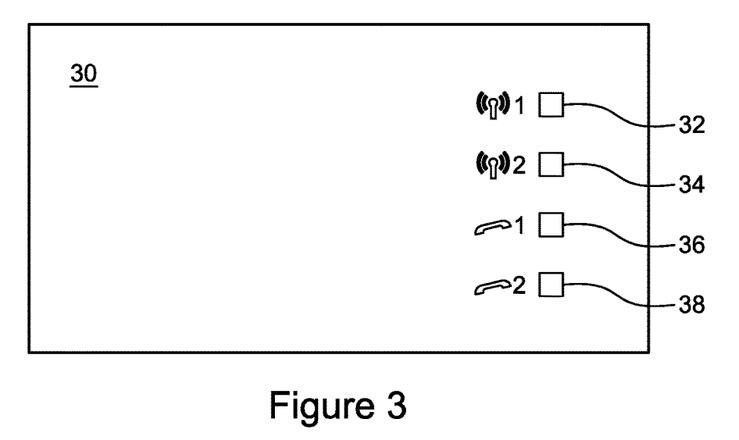
FIG. 3 is a diagram showing an example of a product according to an embodiment of the present disclosure.

FIG. 1 is a diagram showing ideal light transfer path 10 according to prior art. In this example, 2 light pipes 12 and 14 and 2 connection bridges 16 and 18 (working as a connection part) are molded with same material as a single non-detachable component for the purpose of easing assembly. A first light pipe 12 is used for transporting a first light 20A (or called first beam of light, or first light beam) from one end to another as indicated by solid line, i.e. from a first LED to an indicator, and a second light pipe 14 is used for transporting a second light 20B (or called second beam of light, or second light beam) emitted by a second LED, as indicated by dash line. The connection bridges 16 and 18 in the shape of rectangular cuboid (right rectangular prism, rectangular parallelepiped, or orthogonal parallelepiped are also used to designate this polyhedron) are used for supporting and holding the light pipes 12 and 14 together. In an ideal case, the first light 20A and the second light 20B shall be transported in their own light pipes. But in reality, light leakage and interference occurs because of the connection bridges 16 and 18. FIG. 2 is a diagram showing actual light transfer according to prior art. As can be seen from the FIG. 2, the first light 20A and the second light 20B are leaked through the connection bridges 16 and 18 to the respective light pipes 12 and 14, in which they are not supposed to be transported. FIG. 3 is a diagram showing an example of a product 30, in which the light guide including light pipes and connection bridges is used to transport light from several LED emitters (internal to the product 30) to the same number of front panel indicators 32, 34, 36 and 38, in order to indicate the status of the product to the user. In the ideal situation, when an event occurs or the status is changed, the corresponding indicator is illuminated. But in practical situation, because of light leakage from adjacent indicators (due to the connection bridges), which shall be dark, may be illuminated with a lower level of brightness, which may result in user's misjudgment of the product status.

According to the present disclosure, it aims to minimize the light leakage and interference. This is achieved by changing physical shape of the connection bridges between light pipes.

In the example below, the light pipes and the connection bridges between the light pipes, working as physical connection parts, are made of a transparent plastic material by molding into a single non-detachable part. It brings cost reduction for manufacturing and assembling the light guiding device into an apparatus or on the circuit board. In order to achieve the objective, the shapes of the connection bridges are changed to prevent or block a light coming from a light pipe from passing through the connection bridges by reflecting the leaking light back to the light pipe where it comes or by transmitting the light to the outside of the connection bridges. So it minimizes the amount of light passing through the connection bridge from one light pipe to another.

Figure 4A:
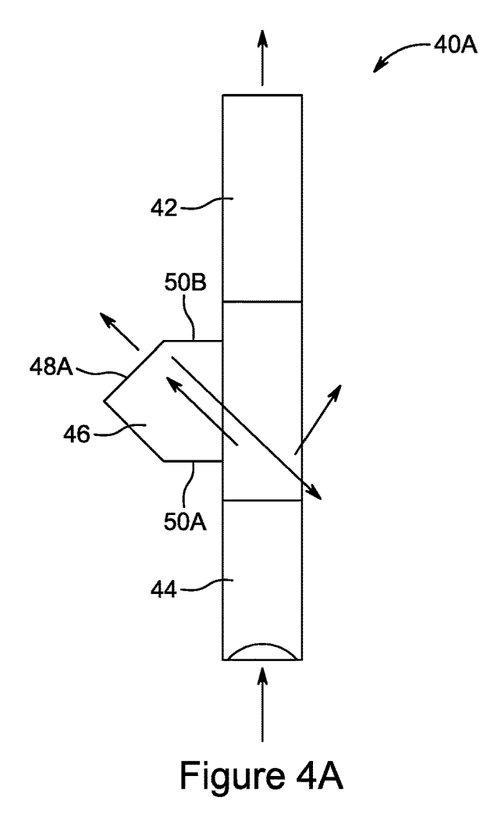
FIGS. 4A, 4B and 4C are diagrams showing side views of 3 examples of connection bridges according to the embodiment of the present disclosure.
Figure 5A:
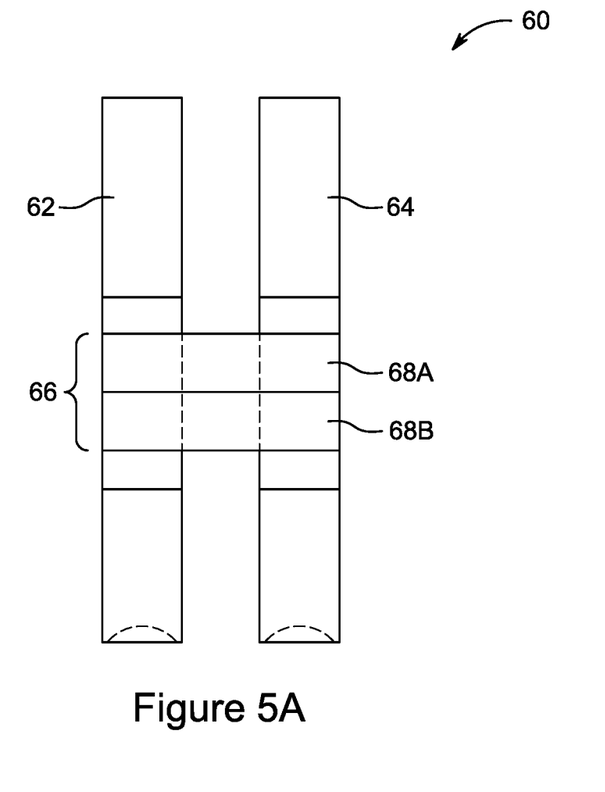
FIGS. 5A, 5B and 5C are diagrams showing front view, top view and right side view of an example of a light guiding device according to the embodiment of the present disclosure.
Figure 5B:
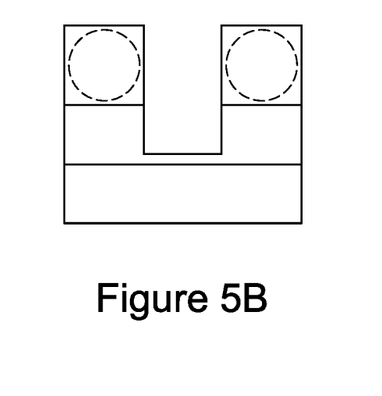
Figure 5C:
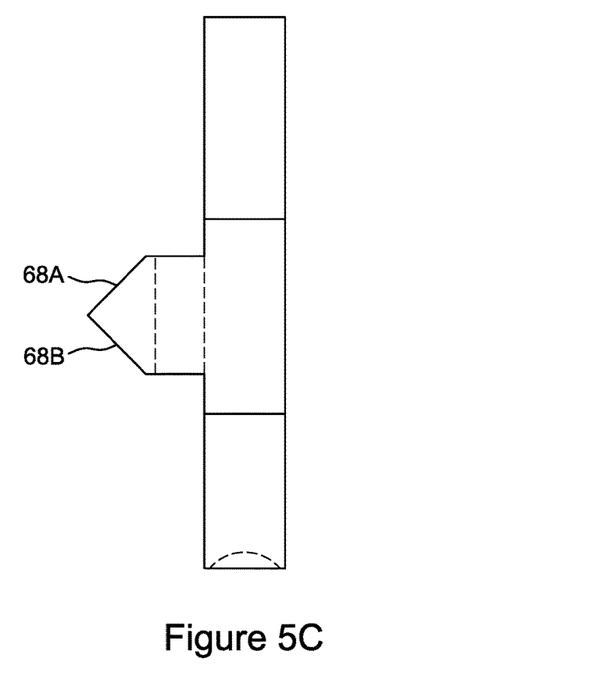

FIG. 4A is a diagram showing side view of an example according to an embodiment of the present disclosure. In the example, the light guiding device 40A includes two straight light pipes 42 and 44 with one connection bridge 46. As can be seen from the FIG. 4A, the connection bridge 46 does not take the shape of rectangular cuboid. Instead, the connection bridge 46 includes two constitution parts, the first one is a triangular prism 48A (having two triangular bases and three rectangular surfaces) and the second one is legs 50A and 50B. The number of legs is the same as that of light pipes, i.e. two legs in this example. For each light pipe, there is a leg connecting the light pipe to the triangular prism. As to the triangular prism 48A, one surface is connected with one end of a leg, and the other two surfaces that don't connect the leg have acute angles with the surface that connects to the leg. The two acute angles can be same or different. In the example of FIG. 4A, the leg 50 is rectangular cuboid in geometric shape. As to the shape of the two bases 50A and 50B of the leg, it is the overlapped part between the surface of the light pipe 40A (which connects the leg) and the projected area of the surface of the triangular prism (which connects the leg) on the plane of the surface of the light pipe (which connects the leg). It shall be noted that it is just for the purpose of description in which we take the connection bridge out of the single non-detachable light guiding device and describe it by using two constitution parts. Or otherwise it is hard to describe the shape of the connection bridge. In reality, the light pipes and the connection bridge are a single component. FIGS. 5A, 5B and 5C are diagrams showing front view, top view and right side view, respectively, of an example of a light guiding device 60 according to the embodiment of the present disclosure. The triangular house-top-shaped surfaces 68A and 68B of the bridge 66 block a light coming from a light pipe 62 or 64 from passing through the bridge 66 by reflecting the light back to the light pipe from which the light originated or by transmitting the light to the outside of the bridge (See e.g., FIG. 4A).

Figure 4B:
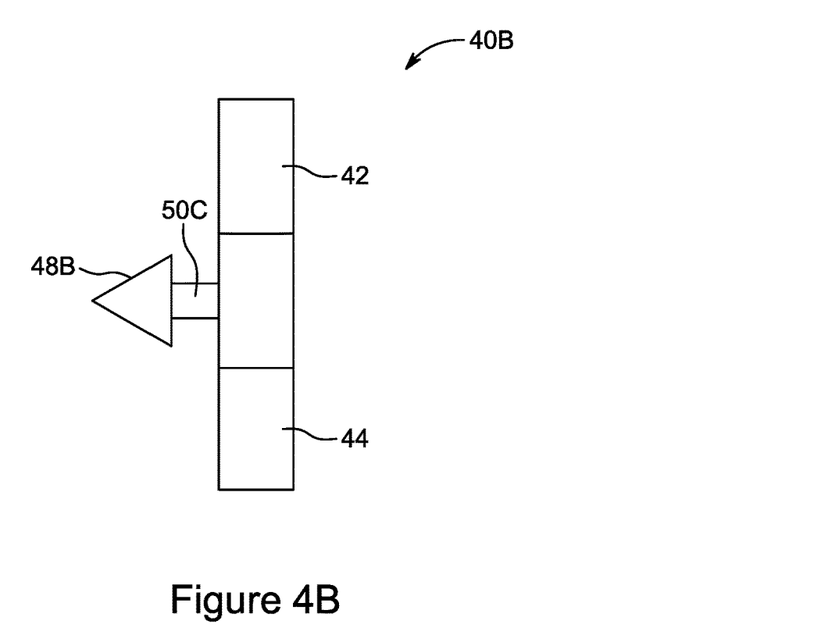
Figure 4C:
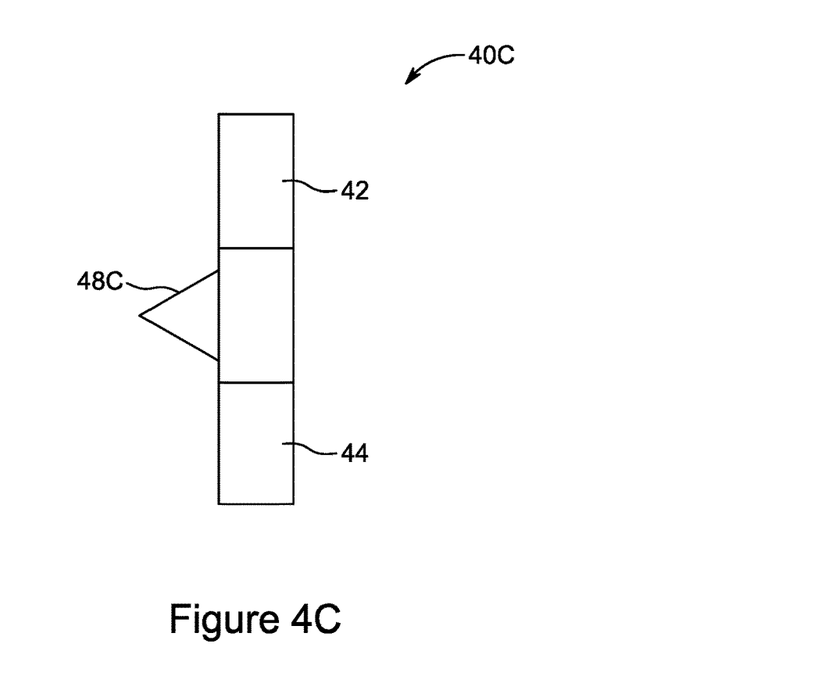

It shall be noted that the leg can be in other shape or even be removed. FIG. 4B is a diagram showing a leg 50C whose bases are smaller than the overlapped part (triangular prism) 48B according to the embodiment of the present disclosure. It shall also be noted that the shape of the leg 50C can be cylinder and other polygonal prisms, for example, quadrangular prism (having two 4-sided polygonal bases), pentangular prism, hexangular prism etc. FIG. 4C is a diagram showing a light guiding device 40C that has no leg according to the embodiment of the present disclosure. In the FIG. 4C, the triangular prism 48C traverses all light pipes and connects to them with one surface.

In the above examples, the shape of light pipe is rectangular cuboid. In a variant example, the shape is cylinder.

In a variant example, the light pipes have gross surfaces and connection bridges have rough surfaces, i.e. all surfaces of constitution parts are rough surfaces. The rough surfaces diffuses a light coming into the bridge as well allows the light to leak to the air instead of transfering to the neighbor pipe.

Figure 6:
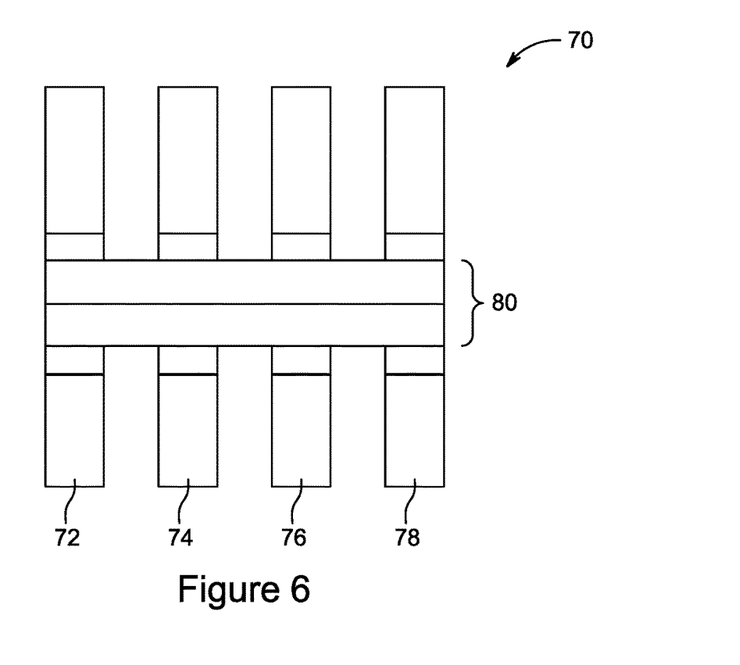
FIG. 6 is a diagram showing a light guiding device having 4 light pipes according to the embodiment of the present disclosure.

In a variant example, the number of light pipes is more than 2. And a connection bridge having more than 2 legs connects all light pipes. FIG. 6 is a diagram showing a light guiding device 70 having 4 light pipes 72, 74, 76 and 78. It shall be noted that the number of connection bridges 80 can be more than 1, for example, 2 connection bridges can be used.

Figure 7A:
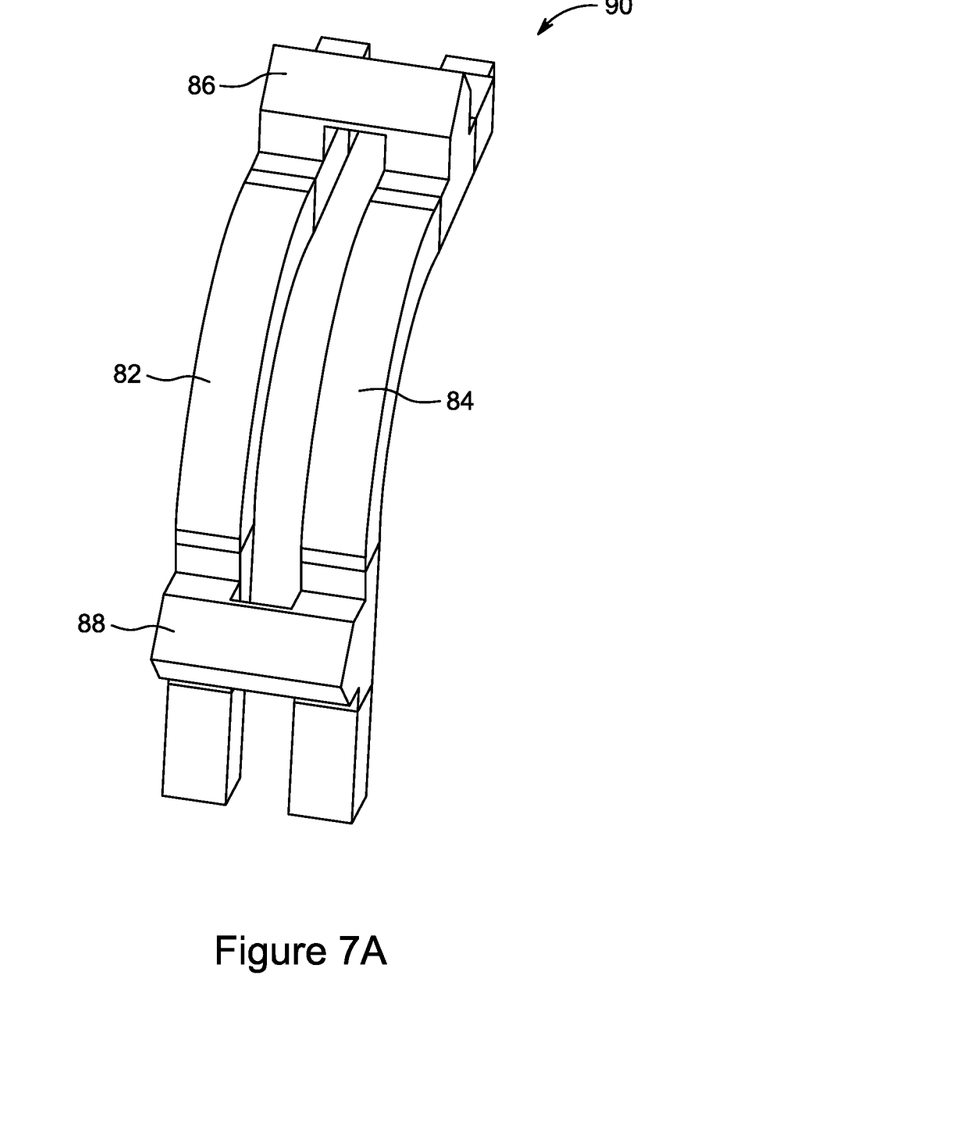
FIGS. 7A and 7B are diagrams showing a light guiding device having 2 light pipes with gentle curving bends and two rows of connection bridges according to the embodiment of the present disclosure.
Figure 7B:
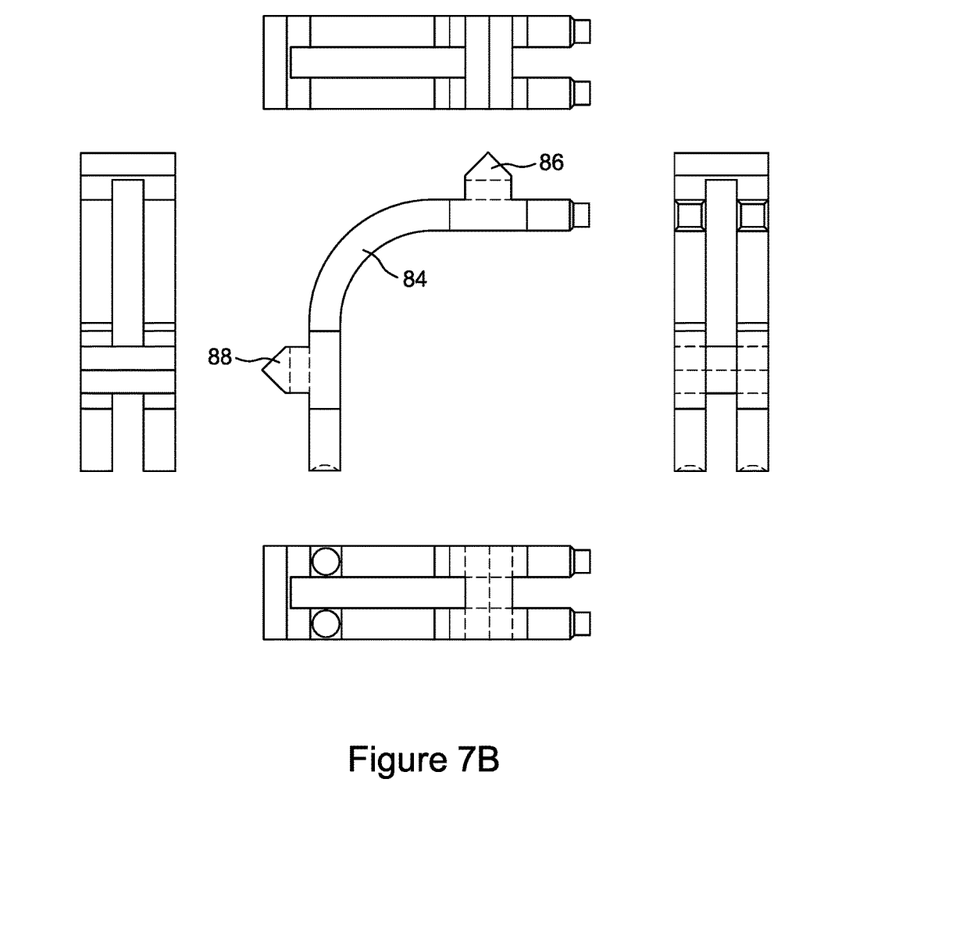
Figure 8A:
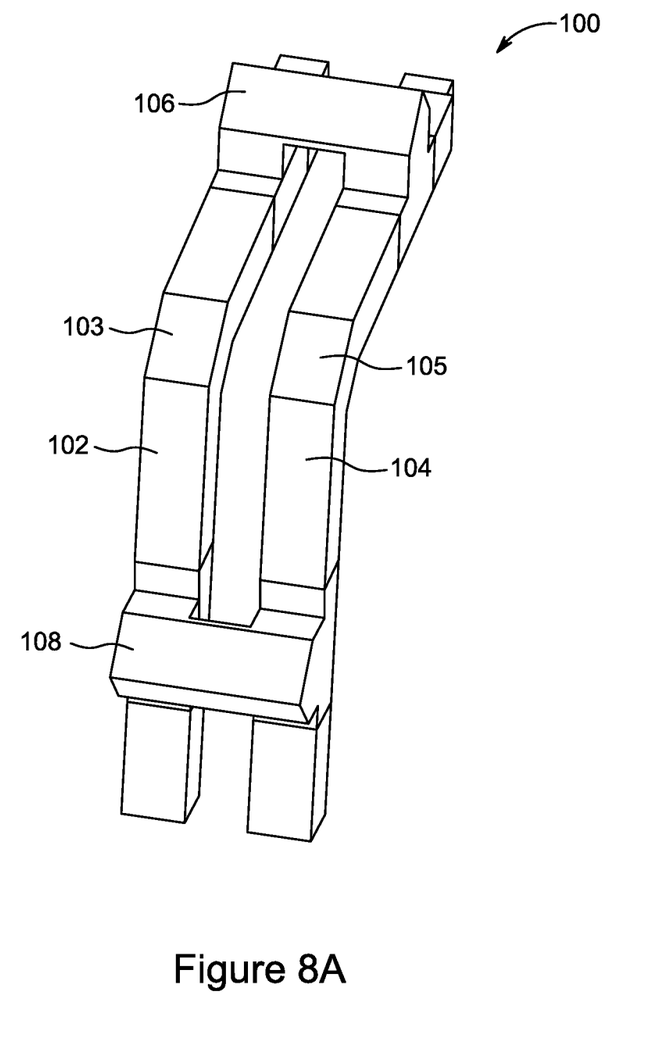
FIGS. 8A and 8B are diagrams showing a light guiding device having 2 light pipes with sharp prismatic folds and two rows of connection bridges according to the embodiment of the present disclosure.
Figure 8B:
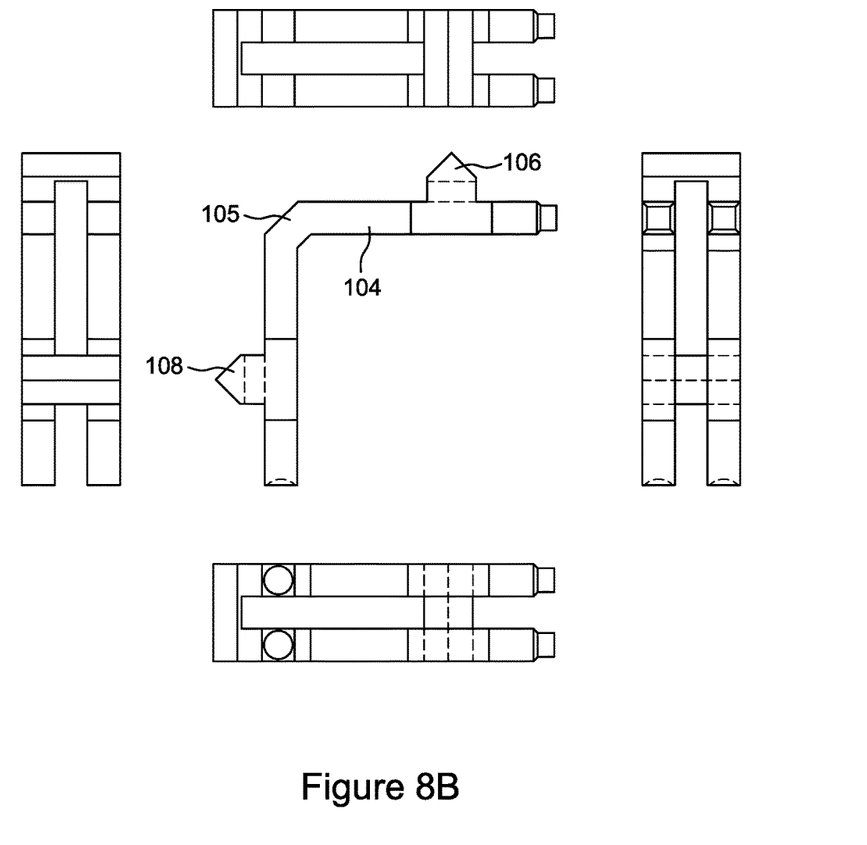

In above examples, the light pipe 70 is straight in shape. In a variant example, the light pipe has a gentle curving bend. FIGS. 7A and 7B are diagrams showing a light guiding device 90 having 2 light pipes 82 and 84 with gentle curving bends and two connection bridges 86 and 88. FIG. 7A shows a final product and FIG. 7B shows top view, left view, front view, right view and bottom view in a direction from the top to the bottom and from the left to the right. In another variant example, the light pipe has a sharp prismatic fold. FIGS. 8A and 8B are diagrams showing a light guiding device 100 having 2 light pipes 102 and 104 with sharp prismatic folds 103 and 105 and two connection bridges 106 and 108. FIG. 8A shows a final product and FIG. 8B shows top view, left view, front view, right view and bottom view in a direction from the top to the bottom and from the left to the right.

Figure 9:
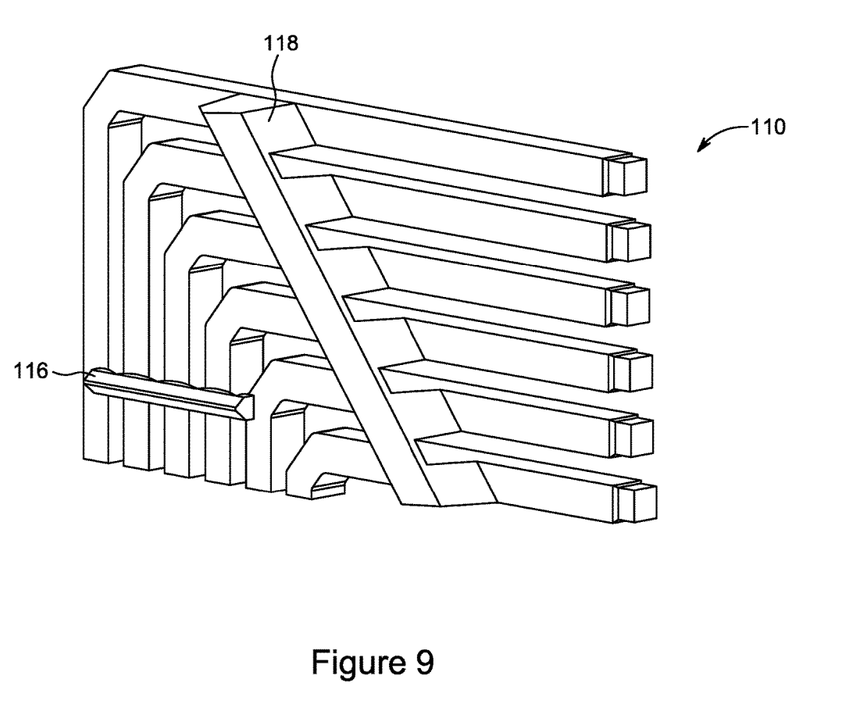
FIG. 9 is a diagram showing a light guiding device having two connection bridges according to the embodiment of the present disclosure.

It shall be noted that if the number of connection bridges is 2 or more, the connection bridges can be different in size. FIG. 9 is a diagram showing a light guiding device 110 having two connection bridges 116 and 118, one (118) is larger and the other (116) is smaller.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the disclosure as defined by the appended claims.

The invention claimed is:

1. A device for transporting light, comprising:
   at least two light pipes; and
   at least one connection part, the at least two light pipes and the at least one connection part connecting the at least two light pipes and being molded with same material as a single component, wherein the at least one connection part comprises a triangular prism having a connection surface for connecting the at least two light pipes and two other surfaces having acute angles with the connection surface, said triangular prism operating to prevent light leakage between the at least two light pipes.

2. The device of the claim 1, wherein each of the at least one connection part further includes at least two legs, each leg connects to a light pipe at one end and to the connection surface of the connection part at the other end.

3. The device of the claim 2, wherein the leg is a polygonal prism or a cylinder in shape.

4. The device of the claim 1, wherein surfaces of the at least one connection part are rough surfaces.

5. The device of the claim 1, wherein number of the at least one connection part is more than two, and the at least one connection part is different in size.

6. The device of the claim 1, wherein the at least two light pipes have a gentle curving bend.

7. The device of the claim 1, wherein the at least two light pipes have a sharp prismatic fold.

8. An electronic device having a light source, and light transporting device and an indicator panel, the light transporting device transports light from the light source to the indicator panel, wherein the light transport device has a structure comprising:
   at least two light pipes; and
   at least one connection part, the at least two light pipes and the at least one connection part connecting the at least two light pipes and being molded with same material as a single component, wherein the at least one connection part comprises a triangular prism having a connection surface for connecting the at least two light pipes and two other surfaces having acute angles with the connection surface, said triangular prism operating to prevent light leakage between the at least two light pipes.

9. The electronic device of claim 8, wherein each of the at least one connection part of the light transport device structure further includes at least two legs, each leg connects to a light pipe at one end and to the connection surface of the connection part at the other end.

10. The electronic device of claim 9, wherein the leg is a polygonal prism or a cylinder in shape.

11. The electronic device of claim 8, wherein surfaces of the at least one connection part of the light transport device structure are rough surfaces.

12. The electronic device of claim 8, wherein a number of the at least one connection part of the light transport device structure is more than two, and the at least one connection part of the light transport device structure is different in size.

13. The electronic device of claim 8, wherein the at least two light pipes of the light transport device structure have a gentle curving bend.

14. The electronic device of claim 8, wherein the at least two light pipes of the light transport device structure have a sharp prismatic fold.

* * * * *